(12) United States Patent
Fisher, Jr. et al.

(10) Patent No.: US 6,415,769 B1
(45) Date of Patent: Jul. 9, 2002

(54) PERFORMANCE ENHANCING SYSTEM FOR ELECTRONICALLY CONTROLLED ENGINES

(75) Inventors: Charles P. Fisher, Jr., Pepperell; Tony Brock-Fisher, Andover, both of MA (US)

(73) Assignee: Blue Chip Diesel Performance, Hudson, NH (US)

( * ) Notice: Subject to any disclaimer, the term of this patent is extended or adjusted under 35 U.S.C. 154(b) by 0 days.

(21) Appl. No.: 09/557,488

(22) Filed: Apr. 24, 2000

(51) Int. Cl.[7] ................................................ F02M 7/00
(52) U.S. Cl. ...................... 123/486; 123/480; 123/510; 123/478; 701/104; 701/105
(58) Field of Search ................................ 123/486, 488, 123/494, 490, 497, 499, 510, 478, 480, 406.45; 701/102, 104, 105; 251/129.1, 129.09, 129.15

(56) References Cited

U.S. PATENT DOCUMENTS

| | | | |
|---|---|---|---|
| 4,788,960 A | * 12/1988 | Oshizawa | 123/494 |
| 4,940,032 A | * 7/1990 | Fujimoto | 123/406.45 |
| 5,115,783 A | 5/1992 | Nakamura et al. | 123/496 |
| 5,201,297 A | 4/1993 | Eblen et al. | 123/502 |
| 5,477,834 A | 12/1995 | Yoshizu | 123/501 |
| 5,582,153 A | 12/1996 | Dutt et al. | 123/450 |
| 5,595,161 A | 1/1997 | Ott et al. | 123/491 |
| 5,697,347 A | 12/1997 | Enomoto et al. | 123/502 |
| 5,769,056 A | 6/1998 | Geiger et al. | 123/502 |
| 5,782,619 A | 7/1998 | Fehlmann | 417/462 |
| 5,782,620 A | 7/1998 | Nothdurft et al. | 417/462 |
| 5,829,413 A | 11/1998 | Rodriguez-Amaya | 123/506 |
| 5,839,412 A | 11/1998 | Stockner et al. | 123/446 |
| 5,848,580 A | 12/1998 | Mashiki | 123/295 |
| 5,899,189 A | 5/1999 | Adelsperger et al. | 123/436 |
| 5,915,356 A | 6/1999 | Oishi et al. | 123/357 |
| 5,919,356 A | 7/1999 | Hood | 210/85 |
| 5,924,403 A | 7/1999 | Thomas | 123/300 |
| 5,924,407 A | 7/1999 | Iwaszkiewicz et al. | 123/446 |
| 5,954,782 A | * 9/1999 | Togai | 701/105 |
| 6,123,058 A | * 9/2000 | Endou | 123/490 |
| 6,213,099 B1 | * 4/2001 | Calvas et al. | 123/490 |
| 6,234,150 B1 | * 5/2001 | Watanabe | 123/490 |
| 6,257,205 B1 | * 7/2001 | Calvas et al. | 701/105 |

* cited by examiner

Primary Examiner—John Kwon
Assistant Examiner—Hieu T. Vo
(74) Attorney, Agent, or Firm—Hamilton, Brook, Smith & Reynolds, P.C.

(57) ABSTRACT

An apparatus and a method of improving performance characteristics of an internal combustion engine is provided which includes electronically coupling a fuel boost controller to a fuel delivery solenoid of a fuel injector. The boost controller measures a timed release of fuel from an activated fuel delivery valve of the fuel delivery solenoid into a cylinder and activates the fuel delivery valve an extended amount of time over a programmed time for injecting additional fuel over the programmed amount into the cylinder to improve the performance characteristics.

32 Claims, 4 Drawing Sheets

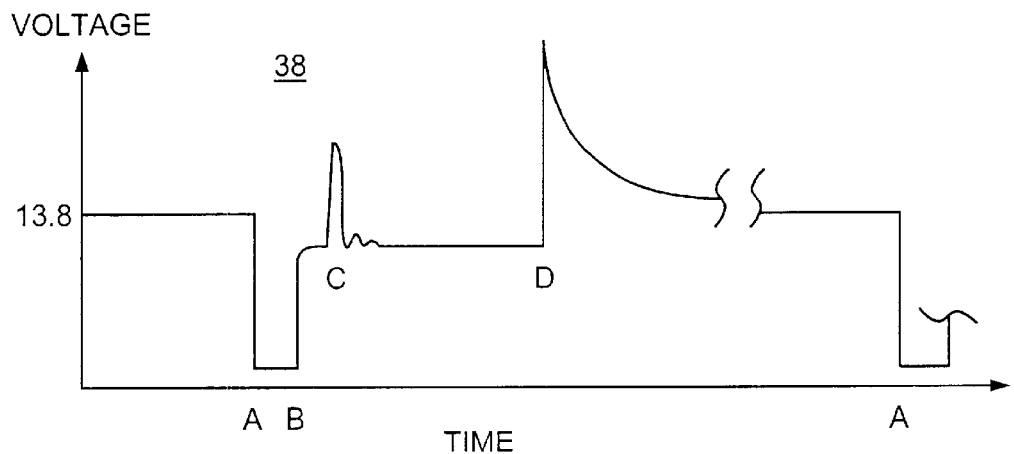
FIG. 2
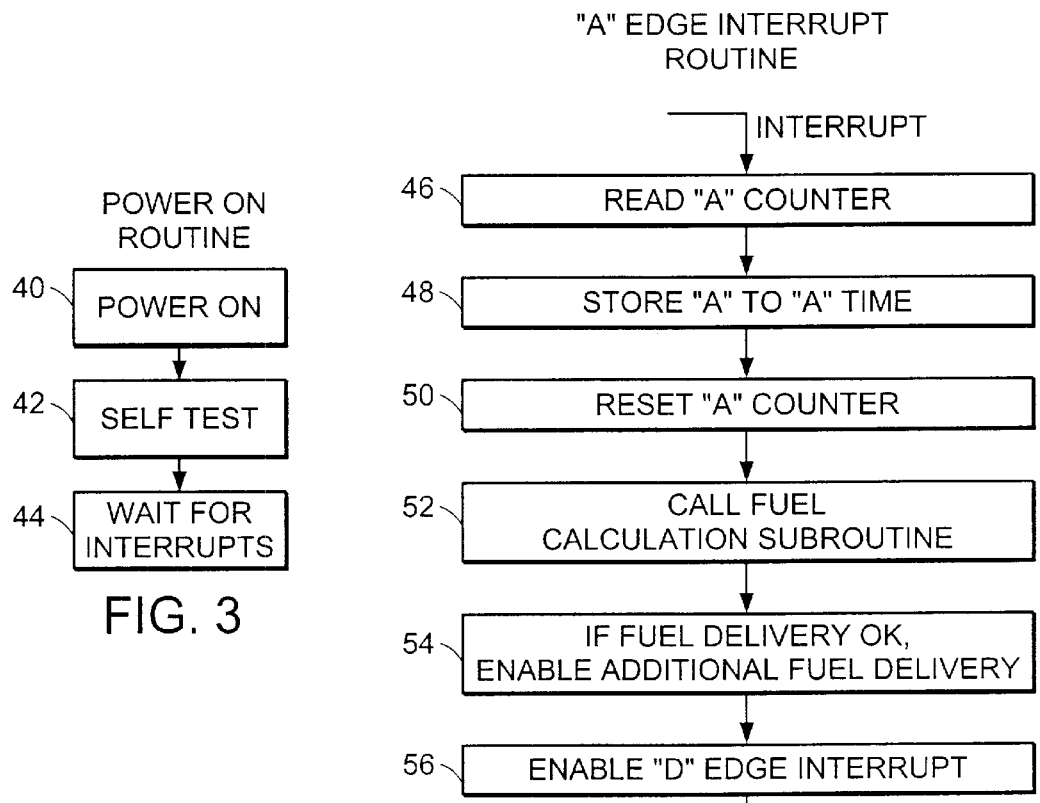
FIG. 3
FIG. 4

PERFORMANCE ENHANCING SYSTEM FOR ELECTRONICALLY CONTROLLED ENGINES

BACKGROUND

Computer technology has been applied to internal combustion engines for quite some time. Microprocessor control circuits have been employed to control real-time computer control of basic engine functions and parameters such as air/fuel ratio and spark ignition timing. These circuits have typically been implemented in gasoline engines.

More recently, these techniques have been applied to diesel engines. For example, the volume and timing of fuel injection has been computer controlled for improved mileage and emissions performance.

One of the problems associated with the computer control systems implemented today is that they provide no means for the end user to adjust or modify the basic performance characteristics that the manufacturer has programmed into the system. For proprietary and other reasons, the information necessary to modify the control systems is not available to the general public. Furthermore, even if such information were generally available, the technical expertise required to utilize such information would be beyond the scope of most individuals or organizations that would be interested in making such performance modifications.

SUMMARY

Accordingly, a system enhances performance characteristics of electronically controlled engines. The system may include components that can quickly and easily be installed and used by a novice. In a particular embodiment, a system of improving performance characteristics of an internal combustion engine can include electronically coupling a fuel boost controller to a fuel delivery solenoid of a fuel injector. The boost controller can measure a timed release of fuel from an activated fuel delivery valve of the fuel delivery solenoid into a cylinder. In a particular embodiment, the activated fuel delivery valve occurs when the fuel delivery valve is closed. In another embodiment, the activated fuel delivery valve occurs when the fuel delivery valve is open.

The boost controller can activate the fuel delivery valve an extended amount of time, such as holding the valve closed, over a programmed time for injecting additional fuel over the programmed amount into the cylinder to improve the performance characteristics. In a particular embodiment, the programmed amount of time is set by the manufacturer.

In one embodiment, the extended amount of time the fuel delivery valve is activated can be determined based on a lookup table. The timing of the extended fuel delivery time can be determined based on a turbo-pressure of the engine.

A self-test may be automatically conducted upon a powering up of the fuel boost controller. The self-test may deliver feedback to the operator that the fuel boost controller is installed properly. Feedback may also be delivered to the operator when additional fuel is being injected into the cylinder. The feedback may be delivered to the operator via a light emitting diode.

The fuel boost controller may calculate the extended amount of time of fuel injection. The actual rotations per minute of the engine and an approximate amount of fuel being commanded by an engine control module and an injection pump computer can be determined. A throttle position value of the engine can further be determined by computing the ratio of the approximate amount of fuel being commanded by the engine control module and the injection pump computer to the available time for each cylinder, as computed from the rotations per minute of the engine.

The throttle position value may be averaged with values of previous throttle position values of other cylinders for removing individual cylinder variations from the averaged value. The total number of averaged values may correspond to an integer multiple of the total number of cylinders of the engine.

The desired amount of additional fuel to be delivered to each cylinder may be determined based on a lookup table. The amount of additional fuel to be delivered may be scaled by a scaling value of additional fuel as a function of the computed throttle position value. The extended amount of time to deliver the additional amount of time of fuel delivery may be computed by multiplying the scaled value by the approximate amount of fuel being commanded by the engine control module and the injection pump computer.

An average extended time may be calculated to smooth out cylinder-to-cylinder variations in fuel delivery and to delay the introduction of additional fuel during snap acceleration for reducing particulate smoke emissions.

A fuel boost controller is also provided for use with an internal combustion engine to improve performance characteristics of the same. An electronic coupler can connect the fuel boost controller to a fuel delivery solenoid of a fuel injector. A measuring routine can measure a timed release of fuel from an activated fuel delivery valve of the fuel delivery solenoid into a cylinder. A fuel delivery routine can activate the fuel delivery valve an extended amount of time over a programmed amount into the cylinder to improve the performance characteristics.

A system is further provided for enhancing performance characteristics of an engine. The system can include an engine control module for controlling operation of the engine and a plurality of sensors connectable to the engine control module for supplying engine data to the engine control module. A fuel injection pump can connect to and be driven by the engine control module to deliver a desired amount and timed delivery of fuel to an injector of each cylinder via a fuel delivery solenoid and a fuel delivery valve. A fuel boost controller can connect to the fuel delivery solenoid for measuring a timed release of fuel from an activated fuel delivery valve of the fuel delivery solenoid into a cylinder. A fuel delivery routine can activate the fuel delivery valve an extended amount of time over a programmed amount into the cylinder to improve the performance characteristics.

BRIEF DESCRIPTION OF THE DRAWINGS

The foregoing and other objects, features and advantages of the invention will be apparent from the following more particular description of a performance enhancing system for electronically controlled engines, as illustrated in the accompanying drawings in which like reference characters refer to the same parts throughout the different views. The drawings are not necessarily to scale, emphasis instead being placed upon illustrating the principles of the invention.

FIG. 2 is a graph that depicts a normal operating waveform seen at a first terminal of a fuel delivery solenoid that is controlled by the fuel injection pump computer.

FIG. 3 is a flowchart of a power up routine.

FIG. 4 is a flowchart of an interrupt routine that is performed for edge "A" of FIG. 2.

DETAILED DESCRIPTION

Figure 1:
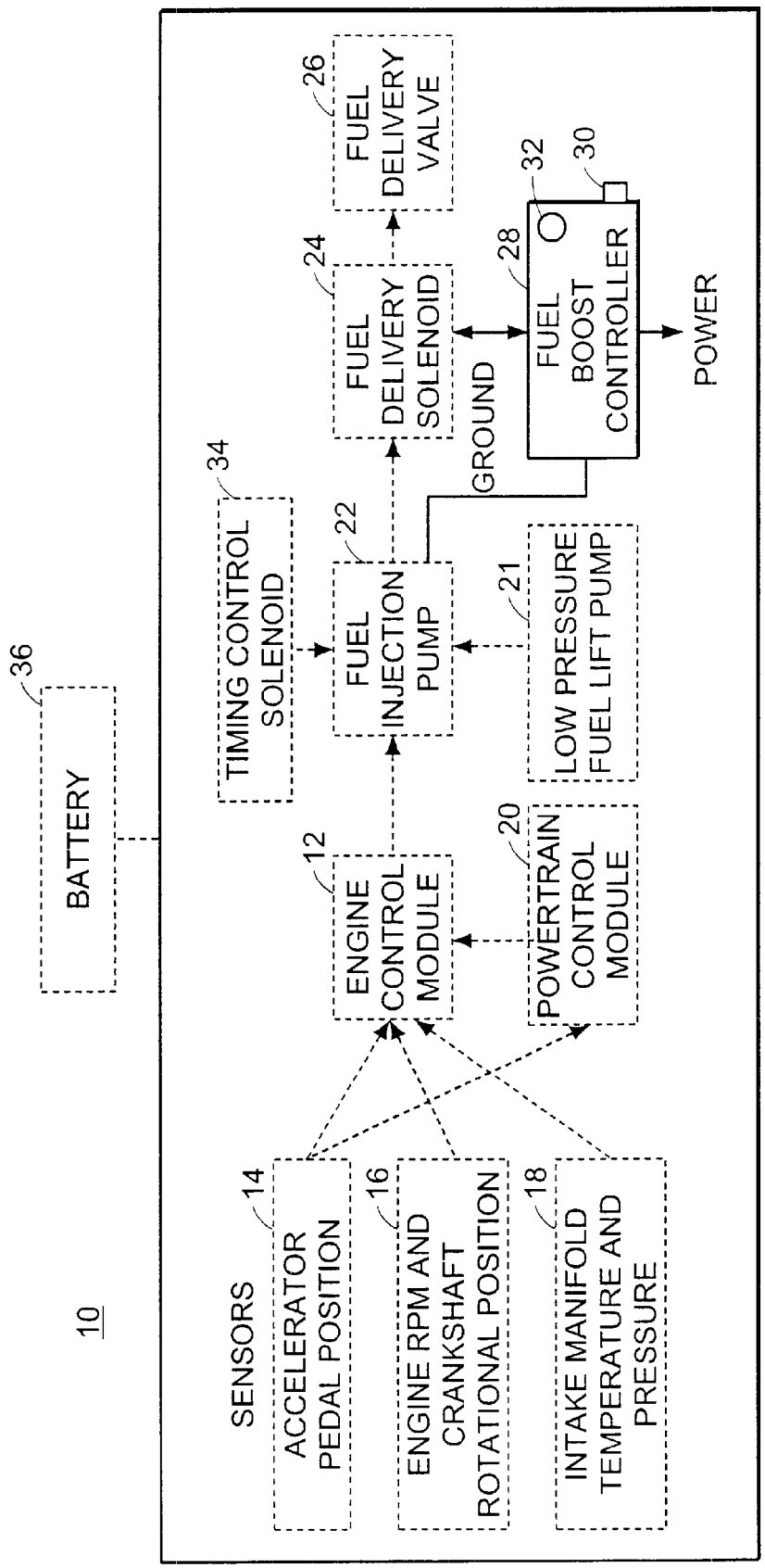
FIG. 1 is a block diagram of a fuel delivery system that controls the amount of fuel delivered to the internal combustion engine.

FIG. 1 is a block diagram of a fuel delivery system 10 that controls the amount of fuel delivered to the cylinders of an internal combustion engine. In a particular embodiment, the engine is a Cummins ISB series, 24 valve diesel engine, which is available as original equipment in the 1999 (and earlier) Dodge Pickup Truck. The specific details described herein are described in reference to such a 1999 Dodge Pickup Truck. The use of that environment to describe detailed embodiments is not meant to be, and should not be interpreted as, a limitation of the invention.

Generally, an Engine Control Module (ECM) 12 receives and interprets various sensors such as accelerator pedal position 14, engine rotations per minute (RPM) and rotational position 16, and intake manifold temperature and pressure 18. ECM 12 also receives data from a Powertrain Control Module (PCM) 20 which controls body functions of the vehicle, such as air conditioning unit, heater controls, cold start, etc. In a particular embodiment, ECM 12 and PCM 20 include microprocessors for processing the data. The ECM 12 controls injection pump 22 to deliver a desired amount and timed delivery of fuel to the injector of each cylinder via a fuel delivery solenoid 24 and fuel delivery valve 26. As shown, a low pressure fuel lift pump 21 supplies low pressure fuel to the injection pump 22.

The injection pump 22 can be an electronically controlled injection pump which includes a computer or microprocessor, such as the Bosch VP44. Further details of the fuel injection pump, solenoid, and delivery valve can be found in U.S. Pat. No. 5,924,407 to Iwaszkiewicz et al., U.S. Pat. No. 5,769,056 to Geiger et al., U.S. Pat. No. 5,829,413 to Rodriguez-Amaya, U.S. Pat. No. 5,782,619 to Fehlmann, U.S. Pat. No. 5,595,161 to Ott et al., U.S. Pat. No. 5,582,153 to Dutt et al., and U.S. Pat. No. 5,782,620 to Nothdurft et al., the entire teachings of each are incorporated herein by reference in their entirety.

As illustrated, a fuel boost controller 28 is retrofitted into a preexisting fuel delivery system to improve performance characteristics of the engine without interfering or modifying any of the manufacturer's system commands, signal, protocols, or other communications. More particularly, the fuel boost controller 28 is connected to the fuel delivery solenoid 24 of the injection pump 22. Generally, the fuel boost controller 28 interprets commands being sent from the injection pump computer 22 and determines the amount of fuel programmed by the manufacturer's system to be delivered in each cylinder. If the fuel boost controller 28 is turned on by switch 30, it calculates and aids in delivering an increase in the amount of fuel delivered to each cylinder. This increases performance characteristics of the engine, for example, horsepower and torque.

The fuel boost controller 28 can be positioned within reach of the vehicle driver. In one embodiment, the fuel boost controller 28 is connected to the fuel delivery system 10 using three wires: a ground wire connecting to injection pump 22, a wire connecting to the fuel delivery solenoid 24, and a wire connecting to the power. In a particular embodiment, the power wire connects to fuse #9 in the fuse panel. Fuel boost controller 28 can include a light emitting diode (LED) 32 which serves numerous functions. First, the LED 32 can be used for self diagnostics to insure the controller has been wired properly. More specifically, when the ignition key is turned "on", the LED 32 should blink once and stay on. This indicates that the ground and power wires are wired correctly. Once the engine is started, the LED 32 should go out which indicates that the solenoid wire is wired properly. Furthermore, during operation, the brightness of the LED 32 is proportional to the amount of fuel delivery enhancement commanded by the fuel boost controller 28. Under moderated to heavy load, the LED 32 may be programmed to stay on.

In unmodified operation of the engine, the following sequence of events takes place in the fuel injection pump 22 to control fuel injection for each cylinder. The injection pump 22, which is driven at camshaft speed, receives a timing reference signal from the ECM 12, which is based upon the crankshaft rotational position sensor 16. When this signal is received, the fuel injection pump computer 22 commands the fuel delivery solenoid 24 to close a fuel delivery valve 26. Later, at a point determined by a timing control solenoid 34, high pressure fuel injection pump 22 begins to build injection pressure. Because the fuel delivery valve 26 is closed, this pressure is directed via a distributor valve arrangement to the injector for the appropriate cylinder. Next, the injector opens and fuel injection starts at this point. When the desired amount of fuel has been delivered to the cylinder, the fuel delivery solenoid 24 is released causing the fuel pressure to the injector to drop as fuel is shunted from the injector, causing the fuel delivery to stop. The amount of fuel delivered is proportional to the amount of pump rotation that occurs between the point when the injection starts and when the fuel delivery solenoid 24 is deactivated.

FIG. 2 depicts a normal operating waveform 38 seen at a first terminal of the fuel delivery solenoid 24 which is controlled by the fuel injection pump computer 22. A second terminal of the solenoid 24 is connected to a high current source of the battery 36, which in a particular embodiment is nominally 13.8 volts. This time waveform 38 depicts a sequence of electronic events that take place for the delivery of fuel to a single cylinder. This sequence is repeated as each cylinder fires in the engine. The signal from the crankshaft rotation position sensor 16 triggers the start of the sequence of electrical events depicted in FIG. 2. While portions of the waveform 38 may vary with different throttle positions, the start of the sequence (point "A") is essentially synchronous with the signal provided by the ELM from the crankshaft position sensor.

At time point "A", the pump 22 turns on a large amount of current to the solenoid 24 which starts moving to close the fuel delivery valve 26. This large amount of current is maintained until time point "B", which can be about 400 microseconds. From point "B" until point "D", a lower amount of current is required and thus supplied by the injection pump computer 22 to hold the solenoid 24 closed. The spike at point "C" is caused by the motion of the valve 26 in the magnetic field of the solenoid and is detected by the injection pump computer 22 to verify that the valve is operating properly.

The fuel boost controller 28 includes a microprocessor and a plurality of comparators. A first comparator detects the high current delivery by the injection computer 22 and supplies this as a positive pulse to the boost microprocessor. A second comparator detects the valve motion pulse at time point "C" and supplies as a negative pulse to the boost microprocessor. A third comparator detects the large current flyback pulse (referred to as "back EMF") at time point "D", when the injection computer 22 is terminating fuel delivery by cutting off the current in the solenoid 24 allowing the solenoid to open. The opening of valve 26 diverts the high injection pressure from the selected injector and allows it to return to the fuel tank by a return line.

The software in the boost microprocessor uses internal counters, running from a fixed clock, to time the duration of these external events, and also to time the extension of the solenoid 24 closure time. The leading edge of the pulse at time point "A" is used as an overall timing reference. By measuring the time interval from one "A" edge to the next "A" edge, the boost microprocessor can compute the actual instantaneous RPM of the engine. By measuring the time interval from the "A" edge to the next "D" edge, the boost microprocessor can compute an approximate estimate of the amount of fuel delivery that is being commanded by the ECM 12 and the injection pump computer 22.

It should be noted that this measurement is not exact due to another timing event which occurs between the injection pump computer 22 and the injection pump. This timing event can be referred to as the fuel injection timing adjustment, which is made by the injection pump computer 22, using another solenoid controlled valve (not shown). This timing adjustment controls the start of actual high pressure injection. Because the fuel boost controller 28 can measure the end of the fuel delivery period, but not the beginning, it does not determine the exact amount of fuel being delivered. In operation of the boost controller 28, by estimating the starting point of fuel delivery, a reasonable approximation can be made which is sufficient for the purposes of the boost controller operation.

The boost controller 28 measures the "A" edge to "A" edge interval and the "A" edge to "D" edge interval. The ratio of the second interval to the first interval indicates a throttle position measurement which is used to determine an amount of additional fuel delivery that should be applied. This determination can be made by the use of an algorithm or other suitable methods. In a particular embodiment, the amount of additional fuel delivery is determined from a table of values or look-up table stored in the boost controller 28.

When the amount of additional fuel delivery is determined, it must be converted into an amount of time that the boost controller 28 will hold the fuel delivery valve 26 closed after the injection computer 22 has released it. This is accomplished by multiplying the actual delivery time ("A" to "D" interval) by the value obtained from the look-up table.

Because of the time required for the boost microprocessor 28 to perform these calculations, the values for additional fuel delivery are not available for use until the following cylinder firing sequence. This is of no consequence, however, as long as new values are available for every cylinder sequence. The one cylinder lag or latency does not have a significant impact on the performance of the boost controller 28. In a particularerred embodiment, the boost microprocessor 28 is fast enough to perform all of these calculations in less than one cylinder time interval, even at the highest RPM of the engine for which fuel delivery augmentation is desired.

Because these events occur asynchronously with the boost microprocessor 22 clock, the measurement and computations are performed by interrupt routines in the software, which allows them to be performed as required and as triggered by the external waveform events.

Referring to FIG. 3, upon initial power 40 to the fuel boost controller 28, the software automatically executes an internal self-test 42, which provides feedback to the user that the controller is installed properly via LED 32. After this test has passed, the software enables the interrupt system, and waits for the interrupt events to occur 44.

FIG. 4 depicts the "A" edge interrupt routine, which is triggered by an interrupt in the "A" edge. This routine reads a counter 46 to determine the amount of time since the last "A" edge occurred. This value is stored in memory 48, and the counter is reset 50 for the subsequent measurement. Next, a subroutine is called that calculates the additional fuel delivery time (described with reference to FIG. 6). If the values for these intervals are within acceptable limits, additional fuel delivery is enabled at 54. If the values are not within acceptable limits, which may be caused by electrical noise interfering with the comparators, or the speed of the engine exceeding predetermined limits, then additional fuel delivery will be disabled. Next, an output from the boost microprocessor 28 is set which enables the hardware to drive the fuel delivery solenoid 24 at the detection of the "D" edge, and initiate another interrupt routine for fuel delivery timing. Finally, an interrupt 56 is enabled to respond to the detection of the "D" edge (see FIG. 5).

Figure 5:
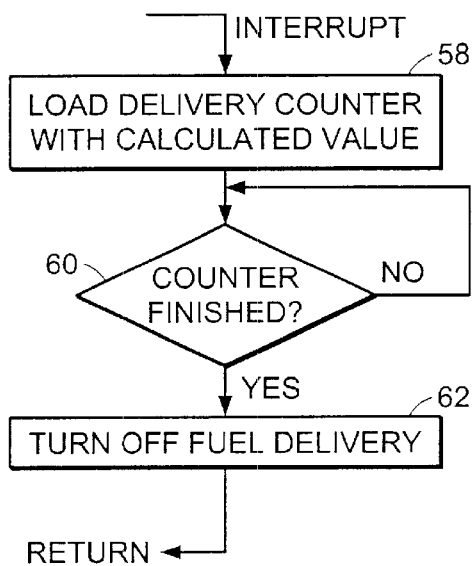
FIG. 5 is a flowchart of an interrupt routine that is performed for edge "D" of FIG. 2.

Turning to the "D" edge interrupt routine of FIG. 5, when the "D" edge occurs, the fuel boost controller 28 will automatically draw sufficient current to keep the fuel delivery solenoid 24 closed, if the additional fuel delivery has been enabled. This subroutine, initiated by the "D" edge, determines the proper time to cease the additional fuel delivery. An internal counter to the boost processor 28 is loaded with the calculated extended time value at 58. When this counter has determined that the calculated extended time value has elapsed at 60, the additional fuel delivery is ceased at 62.

Figure 6:
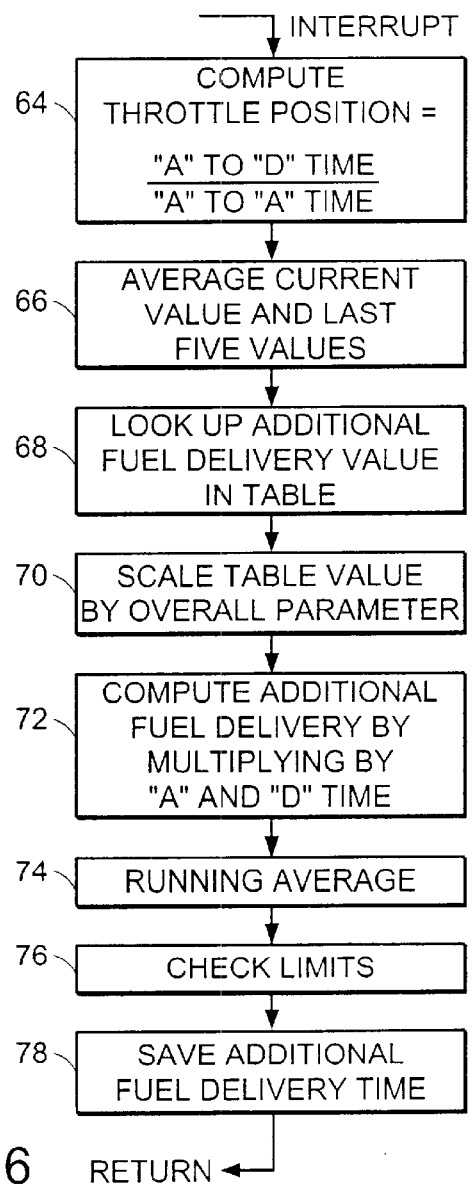
FIG. 6 is a flowchart of a subroutine that calculates additional fuel delivery time.

Referring now to FIG. 6, the subroutine that calculates the additional fuel delivery time first computes the throttle position as defined by the ratio of the "A" to "D" time to the "A" to "A" time. This can be expressed as the ratio of the time of fuel delivery from mthe ELM to the time between successive cylinder firings. Because the ECM 12 and injection pump computer 22 may make cylinder-dependent adjustments for purposes such as efficiency, it is preferred that these compensations not be interfered with by the fuel boost controller 28. Accordingly, a running average is performed at 66 on the throttle position values for each cylinder. For example, if the engine has six cylinders, the running average is performed for the present throttle position value and the previous five throttle position values. This serves to remove individual cylinder compensations from the averaged value.

The average value is used to perform a look-up of the desired additional fuel delivery based on the injection pump computer 22 commanded fuel delivery. An exemplary look-up table is provided in Appendix A. Generally, the look-up table allows for a controlled, gradual augmentation of the stock fuel delivery with an additional fuel delivery controlled by the fuel boost controller 28. This way, additional fuel delivery can be controlled to occur only at moderate to large throttle positions, and the controller 28 does not affect the fuel economy or emissions performance at low to moderate throttle positions.

A particular look-up table includes four columns. The first column is an index number which is an arbitrary unit ranging from 0 to 255. The stroke percentage column indicates the percent of one cylinder's time that the injection pump computer 22 is delivery fuel. This is used as the measured throttle position. The boost percentage is the amount of additional fuel to be delivered by the fuel boost controller 28. In a particular embodiment, the boost percentage is normalized, i.e., it runs from 0 to 1. This value is multiplied by an overall scale factor at step 70, nominally thirty percent in regular production units, to allow different performance levels to be obtained from the controller 28. This result is multiplied by the actual stock fuel delivery time to give a value of additional time for which the fuel boost controller 28 holds the fuel delivery valve 26 closed. The code column is the boost value, expressed in computer units.

Figure 7:
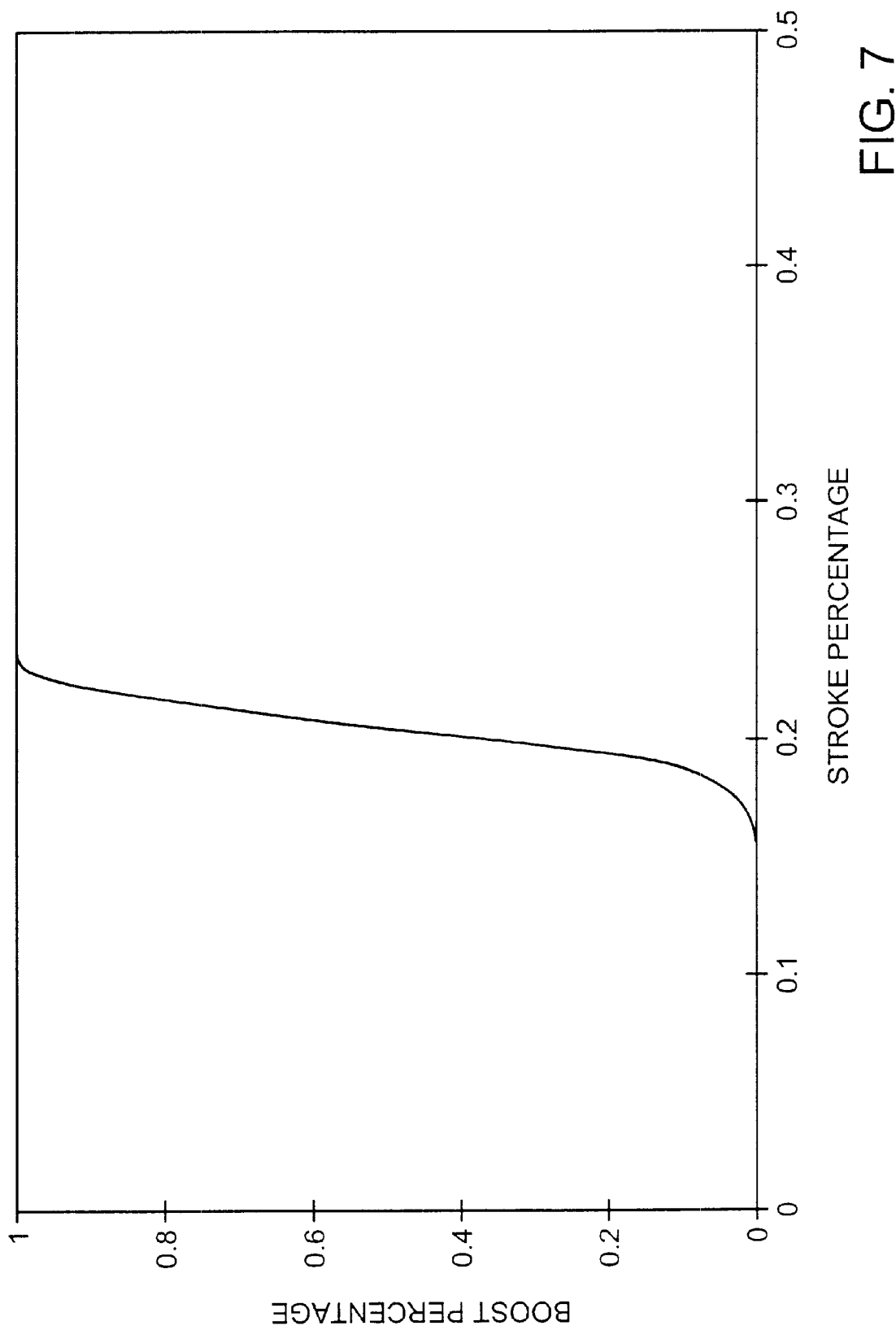
FIG. 7 is a graph illustrating throttle response.

Next, an exact additional fuel delivery time is computed from the fuel delivery value by multiplying the scaled value by the "A" to "D" time at 72. This delivery time is expressed in counter units. The final delivery time is also subjected to a running average at 74 which serves at least two useful functions. First, it additionally smooths out cylinder-to-cylinder variations in fuel delivery, resulting in smoother throttle response (see FIG. 7). Second, it serves to introduce an overall delay between when large, fast throttle openings occur and when additional fuel delivery occurs. This delay can be on the order of one half to one second, and serves to allow time for the turbocharger on the engine to build up intake air boost pressure. By delaying fuel delivery relative to the boost pressure, particulate smoke emissions from the engine during snap acceleration are reduced. In an alternative embodiment, the fuel boost controller 28 is electronically coupled to the turbocharger and receives the turbo-pressure as an input. The controller 28 bases the timing of the fuel delivery on the turbo-pressure to reduce particulate smoke emissions.

If the resultant delivery fuel delivery time is within acceptable limits 76, it is saved for later use by the "D" edge interrupt service routine, in timing the actual additional fuel delivery.

In one embodiment, the fuel boost controller 28 can be programmed to cause varying performance levels of the engine. For example, the controller 28 can be programmed to improve horsepower up to about 113 per cent. In a particular embodiment, the fuel boost controller 28 includes jumpers which allow the operator to selectively chose the desired amount of performance increase. In another particular embodiment, jumpers are provided on the controller 28 to selectively delay the addition of fuel to reduce particulate smoke emissions.

While the performance enhancing system for electronically controlled engines has been particularly shown and described with references to particular embodiments thereof, it will be understood by those skilled in the art that various changes in form and details may be made therein without departing from the scope of the invention encompassed by the appended claims.

APPENDIX A

| start i = index | 90 end i = stroke % | 120 boost % | max = 1 code |
|---|---|---|---|
| 0 | 0 | 0 dt | 0 |
| 1 | 0.00196 | 0 dt | 0 |
| 2 | 0.00392 | 0 dt | 0 |
| 3 | 0.00588 | 0 dt | 0 |
| 4 | 0.00784 | 0 dt | 0 |
| 5 | 0.0098 | 0 dt | 0 |
| 6 | 0.01176 | 0 dt | 0 |
| 7 | 0.01373 | 0 dt | 0 |

APPENDIX A-continued

| start i = index | 90 end i = stroke % | 120 boost % | max = 1 code |
|---|---|---|---|
| 8 | 0.01569 | 0 dt | 0 |
| 9 | 0.01765 | 0 dt | 0 |
| 10 | 0.01961 | 0 dt | 0 |
| 11 | 0.02157 | 0 dt | 0 |
| 12 | 0.02353 | 0 dt | 0 |
| 13 | 0.02549 | 0 dt | 0 |
| 14 | 0.02745 | 0 dt | 0 |
| 15 | 0.02941 | 0 dt | 0 |
| 16 | 0.03137 | 0 dt | 0 |
| 17 | 0.03333 | 0 dt | 0 |
| 18 | 0.03529 | 0 dt | 0 |
| 19 | 0.03725 | 0 dt | 0 |
| 20 | 0.03922 | 0 dt | 0 |
| 21 | 0.04118 | 0 dt | 0 |
| 22 | 0.04314 | 0 dt | 0 |
| 23 | 0.0451 | 0 dt | 0 |
| 24 | 0.04706 | 0 dt | 0 |
| 25 | 0.04902 | 0 dt | 0 |
| 26 | 0.05098 | 0 dt | 0 |
| 27 | 0.05294 | 0 dt | 0 |
| 28 | 0.0549 | 0 dt | 0 |
| 29 | 0.05686 | 0 dt | 0 |
| 30 | 0.05882 | 0 dt | 0 |
| 31 | 0.06078 | 0 dt | 0 |
| 32 | 0.06275 | 0 dt | 0 |
| 33 | 0.06471 | 0 dt | 0 |
| 34 | 0.06667 | 0 dt | 0 |
| 35 | 0.06863 | 0 dt | 0 |
| 36 | 0.07059 | 0 dt | 0 |
| 37 | 0.07255 | 0 dt | 0 |
| 38 | 0.07451 | 0 dt | 0 |
| 39 | 0.07647 | 0 dt | 0 |
| 40 | 0.07843 | 0 dt | 0 |
| 41 | 0.08039 | 0 dt | 0 |
| 42 | 0.08235 | 0 dt | 0 |
| 43 | 0.08431 | 0 dt | 0 |
| 44 | 0.08627 | 0 dt | 0 |
| 45 | 0.08824 | 0 dt | 0 |
| 46 | 0.0902 | 0 dt | 0 |
| 47 | 0.09216 | 0 dt | 0 |
| 48 | 0.09412 | 0 dt | 0 |
| 49 | 0.09608 | 0 dt | 0 |
| 50 | 0.09804 | 0 dt | 0 |
| 51 | 0.1 | 0 dt | 0 |
| 52 | 0.10196 | 0 dt | 0 |
| 53 | 0.10392 | 0 dt | 0 |
| 54 | 0.10588 | 0 dt | 0 |
| 55 | 0.10784 | 0 dt | 0 |
| 56 | 0.1098 | 0 dt | 0 |
| 57 | 0.11176 | 0 dt | 0 |
| 58 | 0.11373 | 0 dt | 0 |
| 59 | 0.11569 | 0 dt | 0 |
| 60 | 0.11765 | 0 dt | 0 |
| 61 | 0.11961 | 0 dt | 0 |
| 62 | 0.12157 | 0 dt | 0 |
| 63 | 0.12353 | 0 dt | 0 |
| 64 | 0.12549 | 0 dt | 0 |
| 65 | 0.12745 | 0 dt | 0 |
| 66 | 0.12941 | 0 dt | 0 |
| 67 | 0.13137 | 0 dt | 0 |
| 68 | 0.13333 | 0 dt | 0 |
| 69 | 0.13529 | 0 dt | 0 |
| 70 | 0.13725 | 0 dt | 0 |
| 71 | 0.13922 | 0 dt | 0 |
| 72 | 0.14118 | 0 dt | 0 |
| 73 | 0.14314 | 0 dt | 0 |
| 74 | 0.1451 | 0 dt | 0 |
| 75 | 0.14706 | 0 dt | 0 |
| 76 | 0.14902 | 0 dt | 0 |
| 77 | 0.15098 | 0 dt | 0 |
| 78 | 0.15294 | 0 dt | 0 |
| 79 | 0.1549 | 0 dt | 0 |
| 80 | 0.15686 | 0 dt | 0 |
| 81 | 0.15882 | 0.004 dt | 1 |
| 82 | 0.16078 | 0.005 dt | 1 |
| 83 | 0.16275 | 0.007 dt | 1 |

APPENDIX A-continued

| start i =<br>index | 90 end i =<br>stroke % | 120<br>boost % | max = 1<br>code |
|---|---|---|---|
| 84 | 0.16471 | 0.009 dt | 2 |
| 85 | 0.16667 | 0.012 dt | 3 |
| 86 | 0.16863 | 0.014 dt | 3 |
| 87 | 0.17059 | 0.018 dt | 4 |
| 88 | 0.17255 | 0.024 dt | 6 |
| 89 | 0.17451 | 0.028 dt | 7 |
| 90 | 0.17647 | 0.033 dt | 8 |
| 91 | 0.17843 | 0.04 dt | 10 |
| 92 | 0.18039 | 0.05 dt | 12 |
| 93 | 0.18235 | 0.058 dt | 14 |
| 94 | 0.18431 | 0.063 dt | 16 |
| 95 | 0.18627 | 0.08 dt | 20 |
| 96 | 0.18824 | 0.1 dt | 25 |
| 97 | 0.1902 | 0.13 dt | 33 |
| 98 | 0.19216 | 0.16 dt | 40 |
| 99 | 0.19412 | 0.20611 dt | 52 |
| 100 | 0.19608 | 0.25 dt | 63 |
| 101 | 0.19804 | 0.29663 dt | 75 |
| 102 | 0.2 | 0.34549 dt | 88 |
| 103 | 0.20196 | 0.39604 dt | 101 |
| 104 | 0.20392 | 0.44774 dt | 114 |
| 105 | 0.20588 | 0.5 dt | 127 |
| 106 | 0.20784 | 0.55226 dt | 141 |
| 107 | 0.2098 | 0.60396 dt | 154 |
| 108 | 0.21176 | 0.65451 dt | 167 |
| 109 | 0.21373 | 0.70337 dt | 180 |
| 110 | 0.21569 | 0.75 dt | 191 |
| 111 | 0.21765 | 0.79389 dt | 203 |
| 112 | 0.21961 | 0.83456 dt | 213 |
| 113 | 0.22157 | 0.87157 dt | 223 |
| 114 | 0.22353 | 0.90451 dt | 231 |
| 115 | 0.22549 | 0.93301 dt | 238 |
| 116 | 0.22745 | 0.95677 dt | 244 |
| 117 | 0.22941 | 0.97553 dt | 249 |
| 118 | 0.23137 | 0.98907 dt | 253 |
| 119 | 0.23333 | 0.99726 dt | 255 |
| 120 | 0.23529 | 1 dt | 255 |
| 121 | 0.23725 | 1 dt | 255 |
| 122 | 0.23922 | 1 dt | 255 |
| 123 | 0.24118 | 1 dt | 255 |
| 124 | 0.24314 | 1 dt | 255 |
| 125 | 0.2451 | 1 dt | 255 |
| 126 | 0.24706 | 1 dt | 255 |
| 127 | 0.24902 | 1 dt | 255 |
| 128 | 0.25098 | 1 dt | 255 |
| 129 | 0.25294 | 1 dt | 255 |
| 130 | 0.2549 | 1 dt | 255 |
| 131 | 0.25686 | 1 dt | 255 |
| 132 | 0.25882 | 1 dt | 255 |
| 133 | 0.26078 | 1 dt | 255 |
| 134 | 0.26275 | 1 dt | 255 |
| 135 | 0.26471 | 1 dt | 255 |
| 136 | 0.26667 | 1 dt | 255 |
| 137 | 0.26863 | 1 dt | 255 |
| 138 | 0.27059 | 1 dt | 255 |
| 139 | 0.27255 | 1 dt | 255 |
| 140 | 0.27451 | 1 dt | 255 |
| 141 | 0.27647 | 1 dt | 255 |
| 142 | 0.27843 | 1 dt | 255 |
| 143 | 0.28039 | 1 dt | 255 |
| 144 | 0.28235 | 1 dt | 255 |
| 145 | 0.28431 | 1 dt | 255 |
| 146 | 0.28627 | 1 dt | 255 |
| 147 | 0.28824 | 1 dt | 255 |
| 148 | 0.2902 | 1 dt | 255 |
| 149 | 0.29216 | 1 dt | 255 |
| 150 | 0.29412 | 1 dt | 255 |
| 151 | 0.29608 | 1 dt | 255 |
| 152 | 0.29804 | 1 dt | 255 |
| 153 | 0.3 | 1 dt | 255 |
| 154 | 0.30196 | 1 dt | 255 |
| 155 | 0.30392 | 1 dt | 255 |
| 156 | 0.30588 | 1 dt | 255 |
| 157 | 0.30784 | 1 dt | 255 |
| 158 | 0.3098 | 1 dt | 255 |
| 159 | 0.31176 | 1 dt | 255 |
| 160 | 0.31373 | 1 dt | 255 |
| 161 | 0.31569 | 1 dt | 255 |
| 162 | 0.31765 | 1 dt | 255 |
| 163 | 0.31961 | 1 dt | 255 |
| 164 | 0.32157 | 1 dt | 255 |
| 165 | 0.32353 | 1 dt | 255 |
| 166 | 0.32549 | 1 dt | 255 |
| 167 | 0.32745 | 1 dt | 255 |
| 168 | 0.32941 | 1 dt | 255 |
| 169 | 0.33137 | 1 dt | 255 |
| 170 | 0.33333 | 1 dt | 255 |
| 171 | 0.33529 | 1 dt | 255 |
| 172 | 0.33725 | 1 dt | 255 |
| 173 | 0.33922 | 1 dt | 255 |
| 174 | 0.34118 | 1 dt | 255 |
| 175 | 0.34314 | 1 dt | 255 |
| 176 | 0.3451 | 1 dt | 255 |
| 177 | 0.34706 | 1 dt | 255 |
| 178 | 0.34902 | 1 dt | 255 |
| 179 | 0.35098 | 1 dt | 255 |
| 180 | 0.35294 | 1 dt | 255 |
| 181 | 0.3549 | 1 dt | 255 |
| 182 | 0.35686 | 1 dt | 255 |
| 183 | 0.35882 | 1 dt | 255 |
| 184 | 0.36078 | 1 dt | 255 |
| 185 | 0.36275 | 1 dt | 255 |
| 186 | 0.36471 | 1 dt | 255 |
| 187 | 0.36667 | 1 dt | 255 |
| 188 | 0.36863 | 1 dt | 255 |
| 189 | 0.37059 | 1 dt | 255 |
| 190 | 0.37255 | 1 dt | 255 |
| 191 | 0.37451 | 1 dt | 255 |
| 192 | 0.37647 | 1 dt | 255 |
| 193 | 0.37843 | 1 dt | 255 |
| 194 | 0.38039 | 1 dt | 255 |
| 195 | 0.38235 | 1 dt | 255 |
| 196 | 0.38431 | 1 dt | 255 |
| 197 | 0.38627 | 1 dt | 255 |
| 198 | 0.38824 | 1 dt | 255 |
| 199 | 0.3902 | 1 dt | 255 |
| 200 | 0.39216 | 1 dt | 255 |
| 201 | 0.39412 | 1 dt | 255 |
| 202 | 0.39608 | 1 dt | 255 |
| 203 | 0.39804 | 1 dt | 255 |
| 204 | 0.4 | 1 dt | 255 |
| 205 | 0.40196 | 1 dt | 255 |
| 206 | 0.40392 | 1 dt | 255 |
| 207 | 0.40588 | 1 dt | 255 |
| 208 | 0.40784 | 1 dt | 255 |
| 209 | 0.4098 | 1 dt | 255 |
| 210 | 0.41176 | 1 dt | 255 |
| 211 | 0.41373 | 1 dt | 255 |
| 212 | 0.41569 | 1 dt | 255 |
| 213 | 0.41765 | 1 dt | 255 |
| 214 | 0.41961 | 1 dt | 255 |
| 215 | 0.42157 | 1 dt | 255 |
| 216 | 0.42353 | 1 dt | 255 |
| 217 | 0.42549 | 1 dt | 255 |
| 218 | 0.42745 | 1 dt | 255 |
| 219 | 0.42941 | 1 dt | 255 |
| 220 | 0.43137 | 1 dt | 255 |
| 221 | 0.43333 | 1 dt | 255 |
| 222 | 0.43529 | 1 dt | 255 |
| 223 | 0.43725 | 1 dt | 255 |
| 224 | 0.43922 | 1 dt | 255 |
| 225 | 0.44118 | 1 dt | 255 |
| 226 | 0.44314 | 1 dt | 255 |
| 227 | 0.4451 | 1 dt | 255 |
| 228 | 0.44706 | 1 dt | 255 |
| 229 | 0.44902 | 1 dt | 255 |
| 230 | 0.45098 | 1 dt | 255 |
| 231 | 0.45294 | 1 dt | 255 |
| 232 | 0.4549 | 1 dt | 255 |
| 233 | 0.45686 | 1 dt | 255 |
| 234 | 0.45882 | 1 dt | 255 |
| 235 | 0.46078 | 1 dt | 255 |

APPENDIX A-continued

| start i = index | 90 end i = stroke % | 120 boost % | max = 1 code |
|---|---|---|---|
| 236 | 0.46275 | 1  dt | 255 |
| 237 | 0.46471 | 1  dt | 255 |
| 238 | 0.46667 | 1  dt | 255 |
| 239 | 0.46863 | 1  dt | 255 |
| 240 | 0.47059 | 1  dt | 255 |
| 241 | 0.47255 | 1  dt | 255 |
| 242 | 0.47451 | 1  dt | 255 |
| 243 | 0.47647 | 1  dt | 255 |
| 244 | 0.47843 | 1  dt | 255 |
| 245 | 0.48039 | 1  dt | 255 |
| 246 | 0.48235 | 1  dt | 255 |
| 247 | 0.48431 | 1  dt | 255 |
| 248 | 0.48627 | 1  dt | 255 |
| 249 | 0.48824 | 1  dt | 255 |
| 250 | 0.4902 | 1  dt | 255 |
| 251 | 0.49216 | 1  dt | 255 |
| 252 | 0.49412 | 1  dt | 255 |
| 253 | 0.49608 | 1  dt | 255 |
| 254 | 0.49804 | 1  dt | 255 |
| 255 | 0.5 | 1  dt | 255 |

What is claim is:

1. A system for enhancing performance characteristics of an engine, comprising:
   an engine control module for controlling operation of the engine;
   a plurality of sensors connectable to the engine control module for supplying engine data to the engine control module;
   a fuel injection pump connectable to and driven by the engine control module to deliver a desired amount and timed delivery of fuel to an injector of each cylinder via a fuel delivery solenoid and a fuel delivery valve;
   a fuel boost controller connectable to the fuel delivery solenoid for measuring a timed release of fuel from an activated fuel delivery valve of the fuel delivery solenoid into a cylinder; and
   a fuel delivery routine for activating the fuel delivery valve an extended amount of time over a programmed amount into the cylinder to improve the performance characteristics.

2. A fuel boost controller for use with an internal combustion engine to improve performance characteristics of the engine, comprising:
   an electronic coupler for connecting the fuel boost controller to a fuel delivery solenoid of a fuel injector;
   a measuring routine for measuring a timed release of fuel from an activated fuel delivery valve of the fuel delivery solenoid into a cylinder; and
   a fuel delivery routine for activating the fuel delivery valve an extended amount of time over a programmed amount into the cylinder to improve the performance characteristics.

3. The fuel boost controller of claim 2, further comprising a lookup table for controlling the extended amount of time the fuel delivery valve is activated.

4. The fuel boost controller of claim 2, further comprising a timer for controlling the timing of the extended fuel delivery time based on a turbo-pressure of the engine.

5. The fuel boost controller of claim 2, further comprising a self-testing routine for automatically conducting a self-test upon powering up of the fuel boost controller for providing feedback to the operator that the fuel boost controller is installed properly.

6. The fuel boost controller of claim 2, further comprising a feedback routine for providing feedback to the operator when additional fuel is being injected into the cylinder.

7. The fuel boost controller of claim 6, wherein the feedback routine includes a light emitting diode.

8. A fuel boost controller for use with an internal combustion engine to improve performance characteristics of the engine, comprising:
   an electronic coupler for connecting the fuel boost controller to a fuel delivery solenoid of a fuel injector;
   a measuring routing for measuring a timed release of fuel from an activated fuel delivery valve of the fuel delivery solenoid into a cylinder;
   a fuel delivery routine for activating the fuel delivery valve an extended amount of time over a programmed amount into the cylinder to improve the performance characteristics; and
   a lookup table for controlling the extended amount of time the fuel delivery valve is activated.

9. A fuel boost controller for use with an internal combustion engine to improve performance characteristics of the engine, comprising:
   an electronic coupler for connecting the fuel boost controller to a fuel delivery solenoid of a fuel injector;
   a measuring routing for measuring a timed release of fuel from an activated fuel delivery valve of the fuel delivery solenoid into a cylinder;
   a fuel delivery routine for activating the fuel delivery valve an extended amount of time over a programmed amount into the cylinder to improve the performance characteristics; and
   a feedback routine for providing feedback to the operator when additional fuel is being injected into the cylinder.

10. A method of improving performance characteristics of an engine, comprising:
    measuring an approximate amount of fuel being delivered to a cylinder of the engine;
    calculating an additional amount of fuel to be delivered to the cylinder to improve the performance characteristics; and
    activating, with a fuel boost controller, a fuel delivery valve of the cylinder an extended amount of time over a programmed time for injecting the additional amount of fuel.

11. The method of claim 10, wherein the step of activating the fuel delivery valve includes holding the fuel delivery valve closed.

12. A method of improving performance characteristics of an internal combustion engine, comprising:
    electronically coupling a fuel boost controller to a fuel delivery solenoid of a fuel injector;
    from the fuel boost controller:
      measuring a timed release of fuel from an activated fuel delivery valve of the fuel delivery solenoid into a cylinder; and
      activating the fuel delivery valve an extended amount of time over a programmed time for injecting additional fuel over the programmed amount into the cylinder to improve the performance characteristics.

13. The method of claim 12, further comprising activating the fuel delivery valve an extended amount of time based on a lookup table.

14. The method of claim 12, wherein the timing of the extended fuel delivery time is based on a turbo-pressure of the engine.

15. The method of claim 12, further comprising automatically conducting a self-test upon powering up of the fuel boost controller for providing feedback to the operator that the fuel boost controller is installed properly.

16. The method of claim 12, further comprising providing feedback to the operator when additional fuel is being injected into the cylinder.

17. The method of claim 16, wherein the feedback is provided via a light emitting diode.

18. The method of claim 12, further comprising calculating, with the fuel boost controller, the extended amount of time.

19. The method of claim 12, further comprising determining an approximate amount of fuel being commanded by an engine control module and an injection pump computer to the cylinder.

20. The method of claim 19, further comprising determining the actual rotations per minute of the engine.

21. The method of claim 20, further comprising determining a throttle position value of the engine by computing the ratio of the approximate amount of fuel being commanded by the engine control module and the injection pump computer to the available time for each cylinder, as computed from the rotations per minute of the engine.

22. The method of claim 21, further comprising averaging the throttle position value with values of previous throttle position values of other cylinders for removing individual cylinder variations from the averaged value.

23. The method of claim 22, wherein the total number of averaged values corresponds to an integer multiple of the total number of cylinders of the engine.

24. The method of claim 22, further comprising determining a desired amount of additional fuel to be delivered to each cylinder based on a lookup table.

25. The method of claim 24, further comprising scaling the amount of additional fuel to be delivered by a scaling value.

26. The method of claim 25, further comprising computing the extended amount of time to deliver the additional fuel by multiplying the scaled value by the approximate amount of fuel being commanded by the engine control module and the injection pump computer.

27. The method of claim 26, further comprising computing an average extended time to smooth out cylinder-to-cylinder variations in fuel delivery.

28. The method of claim 26, further comprising delaying the introduction of additional fuel during snap acceleration for reducing particulate smoke emissions.

29. The method of claim 12, wherein the step of activating the fuel delivery valve includes holding the fuel delivery valve closed.

30. A method of improving performance characteristics of an internal combustion engine, comprising:
  electronically coupling a fuel boost controller to a fuel delivery solenoid of a fuel injector;
  from the fuel boost controller:
    measuring a timed release of fuel from an activated fuel delivery valve of the fuel delivery solenoid into a cylinder; and
    activating the fuel delivery valve an extended amount of time over a programmed amount into the cylinder to improve the performance characteristics, the timing of the extended fuel delivery time being based on a turbo-pressure of the engine.

31. A method of improving performance characteristics of an internal combustion engine, comprising:
  electronically coupling a fuel boost controller to a fuel delivery solenoid of a fuel injector;
  from the fuel boost controller:
    measuring a timed release of fuel from an activated fuel delivery valve of the fuel delivery solenoid into a cylinder;
    activating the fuel delivery valve an extended amount of time over a programmed time for injecting additional fuel over the programmed amount into the cylinder to improve th performance characteristics; and
    timing of the extended fuel delivery time being based on a turbopressure of the engine;
  feedback being provided to the operator when additional fuel is being injected into the cylinder.

32. A method of improving performance characteristics of an engine, comprising:
  measuring an approximate amount of fuel being delivered to a cylinder of the engine;
  calculating an additional amount of fuel to be delivered to the cylinder to improve the performance characteristics; and
  activating, with a fuel boost controller, a fuel delivery valve of the cylinder an extended amount of time over a programmed time for injecting the additional amount of fuel, the step of activating the fuel delivery valve including holding the fuel delivery valve closed.

* * * * *

UNITED STATES PATENT AND TRADEMARK OFFICE
CERTIFICATE OF CORRECTION

PATENT NO. : 6,415,769 B1
DATED : July 9, 2002
INVENTOR(S) : Charles P. Fisher, Jr. and Tony Brock-Fisher.

It is certified that error appears in the above-identified patent and that said Letters Patent is hereby corrected as shown below:

Column 12,
Line 11, delete "routing" and insert -- routine --.
Line 25, delete "routing" and insert -- routine --.

Column 14,
Line 28, delete "th" and insert -- the --.

Signed and Sealed this

First Day of October, 2002

*Attest:*

JAMES E. ROGAN
*Attesting Officer*    *Director of the United States Patent and Trademark Office*